US005117343A

United States Patent [19]

Kerscher et al.

[11] Patent Number: 5,117,343

[45] Date of Patent: May 26, 1992

[54] REFLECTOR ARRANGEMENT

[75] Inventors: Max Kerscher, Chieming; Gerhard Stempel, Toeging/Inn, both of Fed. Rep. of Germany

[73] Assignee: Siemens Aktiengesellschaft, Munich, Fed. Rep. of Germany

[21] Appl. No.: 705,785

[22] Filed: May 28, 1991

[30] Foreign Application Priority Data

Jun. 19, 1990 [DE] Fed. Rep. of Germany ....... 9006883

[51] Int. Cl.[5] .............................. F21V 7/4; G02B 5/8; G02B 7/18

[52] U.S. Cl. .................................... 362/297; 362/346; 362/347; 359/871; 428/912.2

[58] Field of Search ............... 350/612, 616, 641, 642, 350/629; 428/912.2; 362/297, 346, 347, 348

[56] References Cited

U.S. PATENT DOCUMENTS

| | | | |
|---|---|---|---|
| 4,344,120 | 8/1982 | Bradley et al. | 362/349 |
| 4,388,678 | 6/1983 | Turner | 362/239 |
| 4,436,372 | 3/1984 | Schmidt et al. | 350/293 |
| 4,447,862 | 5/1984 | Shanks | 362/267 |
| 4,460,946 | 7/1984 | Tinz | 362/319 |
| 4,809,147 | 2/1989 | Negishi | 362/347 |

FOREIGN PATENT DOCUMENTS

| | | | |
|---|---|---|---|
| 386670B | 9/1988 | Austria . | |
| 0347867 | 6/1989 | European Pat. Off. . | |
| 1792909 | 8/1958 | Fed. Rep. of Germany . | |
| 3447136 | 6/1986 | Fed. Rep. of Germany | 428/912.2 |
| 3446917A1 | 7/1986 | Fed. Rep. of Germany . | |
| 3534285A1 | 2/1987 | Fed. Rep. of Germany . | |
| 8803720 | 3/1988 | Fed. Rep. of Germany . | |
| 3711568A1 | 10/1988 | Fed. Rep. of Germany . | |
| 8810422.2 | 11/1988 | Fed. Rep. of Germany . | |
| 3820926A1 | 12/1989 | Fed. Rep. of Germany . | |
| 459308 | 12/1950 | Italy | 362/341 |
| 862073 | 3/1961 | United Kingdom . | |
| 2048166 | 3/1980 | United Kingdom | 428/912.2 |

*Primary Examiner*—Ira S. Lazarus

*Assistant Examiner*—Leonard Heyman

*Attorney, Agent, or Firm*—Hill, Van Santen, Steadman & Simpson

[57] ABSTRACT

Given a reflector arrangement in a device that is employed for the individual illumination of objects, high demands must be made of the durability of the mirror layers to be applied onto carriers. Considerable difficulties result in satisfying this demand, particularly given large-area reflector arrangements which are exposed to weather. In order to overcome these difficulties, the reflector arrangement is designed with shell carriers of transparent material that are designed tub-shaped and which have a vapor-deposited mirror layer provided on the side of the shell. This mirror layer is durably protected with suitable cover techniques against environmental influences which deteriorate or destroy it.

13 Claims, 3 Drawing Sheets

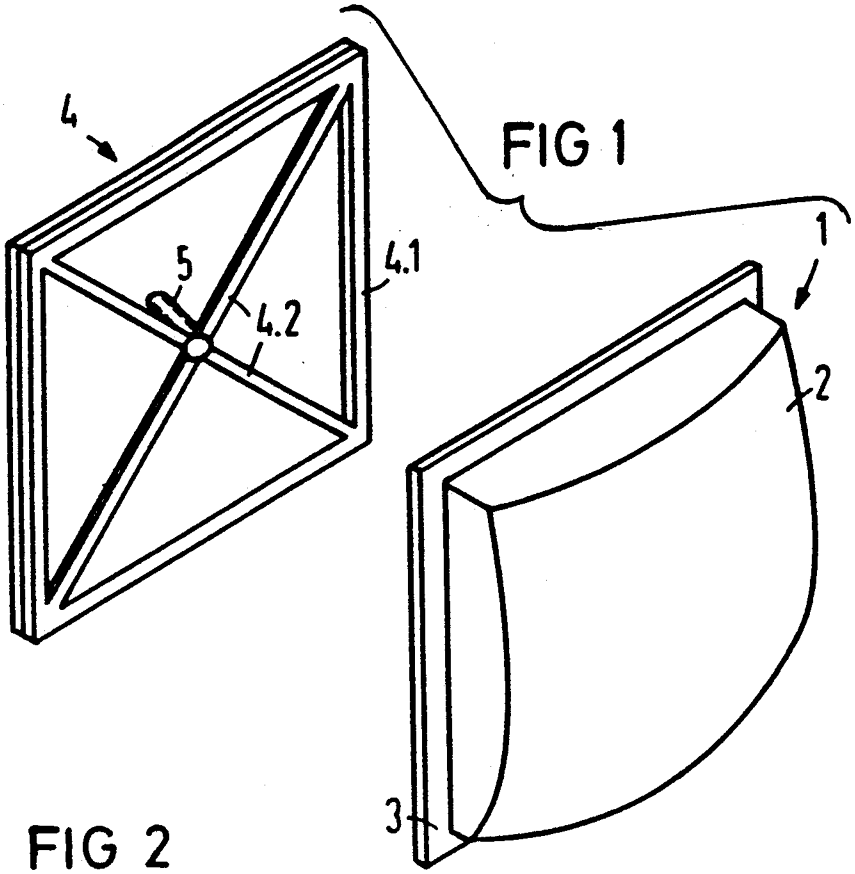
FIG 1
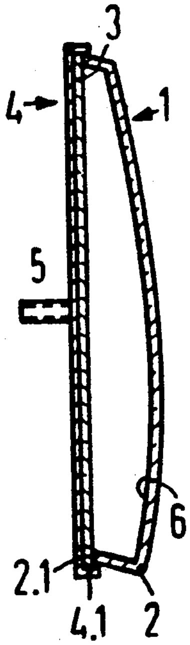
FIG 2
FIG. 3A
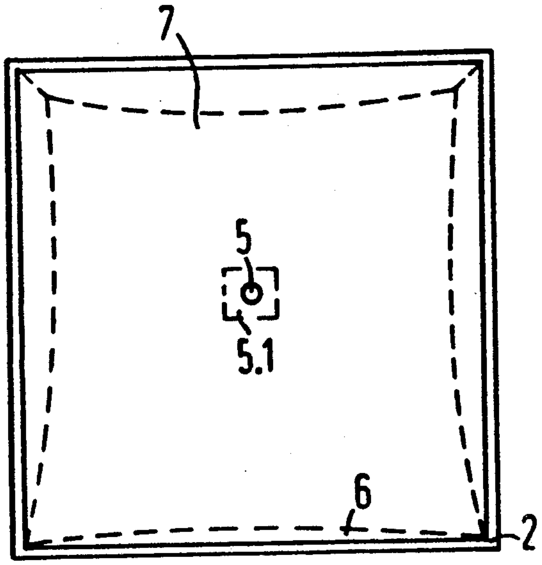
FIG. 3B
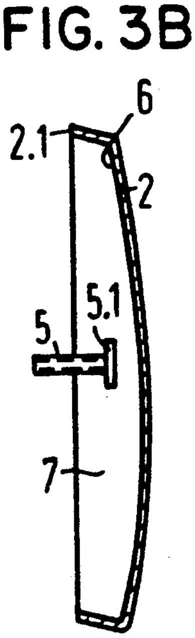

REFLECTOR ARRANGEMENT

BACKGROUND OF THE INVENTION

The invention is directed to an apparatus for individual illumination of objects, comprising a stationarily attached reflector arrangement which reflects incident light rays in a direction onto the objects to be illuminated.

Apparatus of this type are disclosed, for example, by AT Patent 38 66 70 B and by DE 35 34 285 A1. The reflector arrangement is arranged at a prescribed height at an erect rail or at a tower. A light source or a spotlight arrangement for illuminating the reflector arrangement is provided either on the ground or at the tower or at the rail at a prescribed distance below the reflector arrangement. The light from the light source or the spotlight arrangement incident on the reflector arrangement is then emitted by the reflector arrangement in the direction of the objects to be illuminated. Given larger fields to be illuminated, the reflector arrangement is formed of sub-reflectors. Undesired glare phenomena can be avoided by reflector surfaces curved in a suitable way.

As practice has shown, particular manufacturing difficulties result for such reflectors when they are exposed year in and year out to different meteorological conditions and air pollutants, as is the case, for example, given an apron illumination for air fields. In such instances, the mirror layer applied to the reflector surface requires a protective layer that meets high demands and whose transparency properties or the like dare not be deteriorated, even in long-term operation, in order to avoid losses in efficiency. Over and above this, it is necessary that the faultless adhesion between the mirror layer and the protective layer arranged thereabove is also preserved when the reflector arrangement is constantly exposed to great temperature fluctuations.

SUMMARY OF THE INVENTION

An object of the invention is to specify a solution for the manufacturing difficulties in view of durable mirror layers having high resistance to environmental influences given reflector arrangements of the afore-mentioned type, this solution overcoming these difficulties in a simple way.

According to the invention, the reflector arrangement has at least one shell carrier of transparent material which is shaped in tub-like fashion. The inside of this shell carrier is provided with a vapor-deposited metallic mirror layer. Light rays to be reflected are incident on the outside of the shell carrier and pass through the transparent material where they are reflected by the mirror layer. The mirror layer is durably protected with a suitable cover technique against environmental influences and direct mechanical influences which may deteriorate or destroy the mirror layer. The shell carrier is provided with a holder at the side of the shell carrier having the mirror layer thereon, and provides for fastening of the shell carrier. The plate which covers an opening of the shell at the side where the mirror layer is located is attached to the shell carrier.

The invention is based on the perception that the mirror layer of such a reflector arrangement can be comprehensively protected in a simple and advantageous way when it is applied to the inside of the shell carrier which is formed of transparent material, and wherein this interior and thus the mirror layer is covered in a suitable way and protected against environmental influences.

BRIEF DESCRIPTION OF THE DRAWINGS

FIG. 1 is a reflector arrangement having a shell carrier, illustrated in an exploded view;

FIG. 2 shows the reflector arrangement of FIG. 1, in section;

FIG. 3 shows a further embodiment of a reflector arrangement formed of a shell carrier;

DESCRIPTION OF THE PREFERRED EMBODIMENTS

Figure 4:
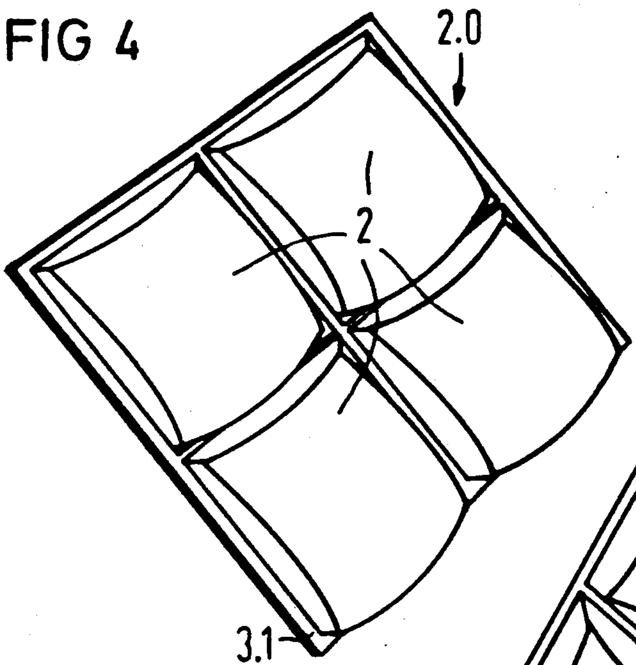
FIGS. 4 and 5 illustrate a reflector arrangement wherein four shell carriers are combined to form a shell carrier unit in a square arrangement.

The reflector arrangement 1 in FIG. 1 is formed of one element which comprises a shell carrier 2 whose inside shell side has a mirror layer 6 of vapor-deposited high-purity aluminum shown in the sectional view of FIG. 2. As shown in FIGS. 1, 2 and 3, the shell carrier 2 is of a tub-like shape and has a curved concave portion as viewed at the mirror layer side, and has sidewalls in a rectangular configuration around the concave portion. Incoming light rays pass through the shell carrier 2, and are reflected by the mirror layer 6 back out through the shell carrier 2. The shell carrier 2 formed of a transparent plastic is deep-drawn from a plate material and is preferably formed of plexiglass. For protecting the mirror layer against environmental influences, the shell carrier has its side at the shell opening closed with a cover plate 3 that is likewise composed of plexiglass and onto which the shell carrier 2 has its shell edge 2.1 glued. The cover plate 3 projects somewhat beyond the shell carrier 2 at all sides and is embraced by a frame mount 4. The frame mount 4 is reinforced by stays 4.2 in its diagonals, a stud 5 being welded fast in the intersection of these stays perpendicular to the frame plane. As needed, the reflector arrangement 1 can be secured to a stand or to a wall mount with this frame stud 5.

As FIG. 3 shows, the interior of the shell carrier—instead of being covered by a cover plate 3—can be foamed out with a moisture-repellant plastic 7 for protecting the mirror layer 6 applied here. The stud 5 thus expediently has its base plate 5.1 anchored in the plastic 7.

Figure 5:
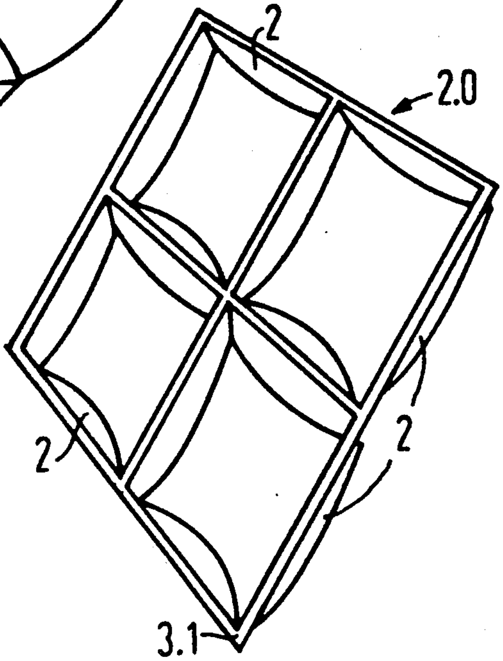
Figures 6A, 6B, 6C, 6D, 6E:
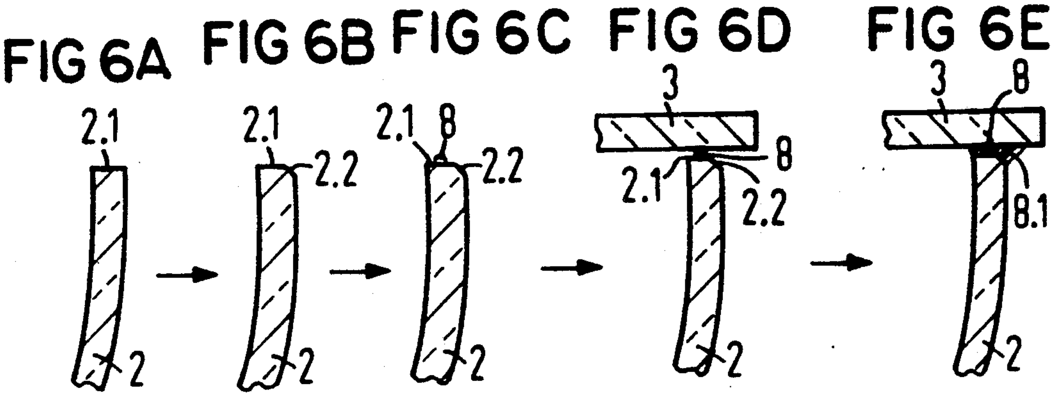
FIG. 6 is a schematic illustration explaining a gluing process between a cover plate and the shell carrier.

Given employment of a cover plate 3, as recited in the embodiment of FIGS. 1 and 2, a plurality of shell carriers can also be combined in a simple way to form a shell carrier unit 2.0 as shown in FIGS. 5 and 6. Here, the cover plate 3.1 represents a carrier plate for all four shell carriers 2 that are glued in common on the carrier plate 3.1 in tight proximity in a square arrangement. Such a shell carrier unit 2.0 can in turn be provided with a holder 4 corresponding to FIG. 1.

A shell carrier 2 must be glued onto the cover plate 3 or 3.1 such that the interior of the shell is terminated in air-tight fashion from the exterior. It is important in this context that the air remaining in the inside of the shell is adequately dry and has no aggressive constituents that attack the mirror layer. For this purpose, the gluing process occurs in a correspondingly prepared atmosphere. FIG. 6 shows a schematic illustration of the individual steps to be implemented during gluing, these steps being indicated with arrows.

A section through a lateral part of a shell carrier 2 with its shell edge 2.1 may be seen at the left. First, the right-hand shell edge 2.1 is provided with a bevel 2.2 and, in the next step, an adhesive 8 is applied point by point on the remaining shell edge 2.1. Subsequently, the shell edge 2.1 of the shell carrier 2 is put in place onto the cover plate 2 and is fixed on the cover plate 3 by the spots of adhesive 8. In a last step, the actual glue 8.1 is introduced between the shell edge 2.1 and the cover plate 3 at the side of the bevel 2.2, and thus an all around sealing connection between the shell carrier 2 and the cover plate 3 is produced.

Given the employment of acrylic for the cover plate 3 and for the shell carrier 2, a glue that is likewise designed on the basis of acrylic is especially suitable, such as, for example, the glue marketed by the Roehm Company under the designation Acryfix 90.

Figure 7:
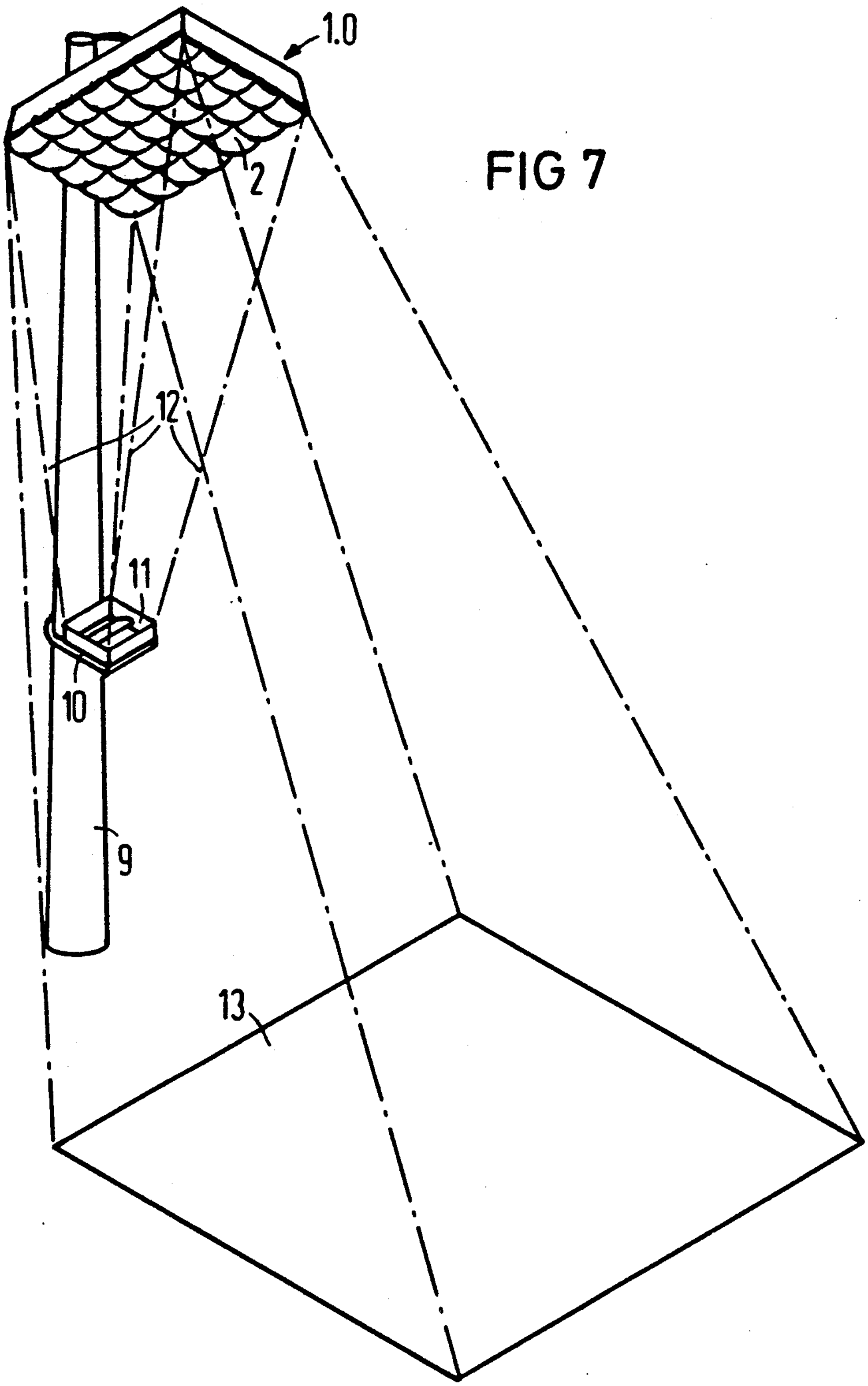
FIG. 7 is a secondary lighting unit suitable for illuminating air field aprons comprising a reflector arrangement formed of a plurality of shell carriers.

The reflector arrangement of FIGS. 1 through 5 can be combined in a multiple arrangement to form an extended reflector arrangement 1.0 representing a reflector field, as shown by the secondary beacon illustrated in perspective in FIG. 7. It is formed of a tower 9 having a spotlight 11 arranged on a platform 10 in the lower third of the tower, this spotlight 11 illuminating the reflector arrangement 1.0 that is thus secured to the upper end of the tower 9. After being reflected at the reflector arrangement 1.0, the light rays 12 produce a sharply limited illumination field 13 in accordance with the desired illumination of objects arranged within this illumination field.

Although various minor changes and modifications might be proposed by those skilled in the art, it will be understood that I wish to include within the claims of the patent warranted hereon all such changes and modifications as reasonably come within my contribution to the art.

I claim as my invention:

1. An apparatus for individual illumination of objects, comprising:

a light source means for generating light rays;

a reflector arrangement positioned relative to said light source generating means such that light rays from the light source means are incident on the reflector arrangement and are reflected in a desired direction onto the objects to be illuminated;

the reflector arrangement comprising at least one shell carrier of transparent material which has a tub-shape with a concave curved portion when viewed from a side opposite the light means, and sidewalls around the curved portion in a rectangular configuration, and wherein an inside of the shell carrier is provided with a vapor-deposited metallic mirror layer such that light rays incident on an outside of the shell carrier pass through the shell carrier and can be reflected by the metallic mirror layer;

cover means provided on the shell carrier for durably protecting the mirror layer against environmental influences and direct mechanical influences which might deteriorate or destroy the mirror layer; and said shell carrier having holder means located at a side of the shell carrier where the mirror layer is located for mounting of the shell carrier.

2. An apparatus according to claim 1 wherein said cover means comprises a plate which covers an opening of the shell carrier at the side where the mirror layer is located, and wherein the cover plate is glued to a side edge of the shell carrier.

3. An apparatus according to claim 1 wherein said cover means for protecting the mirror layer comprises a moisture-repellant plastic foam filling an interior of the shell carrier at the side of the shell carrier where the mirror layer is located.

4. An apparatus according to claim 1 wherein said cover means comprises a plastic foam in an interior of the shell carrier at the side where the mirror layer is located and wherein a cover plate is provided and attached to the shell carrier at an opening at the side where the mirror layer is located and which closes the shell carrier in air-tight fashion.

5. An apparatus according to claim 1 wherein at least two shell carriers are combined with one another in immediate juxtaposition to one another to form a shell carrier unit having a common mount.

6. An apparatus according to claim 1 wherein said holder means comprises a stud lying perpendicular to an opening of the shell carrier at the side where the mirror layer is located and which projects beyond an edge of the shell carrier.

7. An apparatus according to claim 6 wherein an interior of the shell carrier is foamed in with plastic and wherein the stud has an associated base anchored in the plastic.

8. An apparatus for individual illumination of objects, comprising:

means for generating light rays;

a reflector arrangement positioned relative to said generating means such that light rays incident thereon are reflected in a desired direction onto the objects to be illuminated;

the reflector arrangement comprising at least one shell carrier of transparent material which has a tub-shape, and wherein an inside of the shell carrier is provided with a vapor-deposited metallic mirror layer such that light rays incident on an outside of the shell carrier pass through the shell carrier and can be reflected by the metallic mirror layer;

covermeans provided on the shell carrier for durably protecting the mirror layer against environmental influences and direct mechanical influences which might deteriorate or destroy the mirror layer;

said shell carrier having holder means located at a side of the shell carrier where the mirror layer is located for mounting of the shell carrier;

said holder means comprising a stud lying perpendicular to an opening of the shell carrier at the side where the mirror layer is located and which projects beyond an edge of the shell carrier; and the cover means comprising a cover plate mounted in an opening of the shell carrier at the side where the mirror layer is located, and wherein two diagonal stays are provided mounted to a frame mount which receives the cover plate and wherein the stud is secured to the two diagonal stays.

9. An apparatus according to claim 1 wherein the shell carrier comprises plexiglas.

10. An apparatus according to claim 1 wherein said cover means comprises a cover plate which is glued to an opening of the shell carrier at the side where the mirror layer is located and wherein the cover plate is formed of a same material as the shell carrier.

11. An apparatus for individual illumination of objects, comprising:

means for generating light rays;

a reflector arrangement positioned relative to said generating means such that light rays incident thereon are reflected in a desired direction onto the objects to be illuminated;

the reflector arrangement comprising at least one shell carrier of transparent material which has a tub-shape, and wherein an inside of the shell carrier is provided with a vapor-deposited metallic mirror laying such that light rays incident on an outside of the shell carrier pass through the shell carrier and can be reflected by the metallic mirror layer;

cover means provided on the shell carrier for durably protecting the mirror layer against environmental influences and direct mechanical influences which might deteriorate or destroy the mirror layer;

said shell carrier having holder means located at a side of the shell carrier where the mirror layer is located for mounting of the shell carrier; and at least four shell carriers being combined to form a shell carrier unit and a square arrangement, and wherein shell edges of the shell carriers are flued onto a common cover plate which serves as a cover means for each of the shell carriers.

12. An apparatus according to claim 11 wherein the shell carriers are glued to the cover plate with a spacing from one another.

13. An apparatus for individual illumination of objects, comprising:

a spotlight;

a reflector arrangement positioned relative to the spotlight such that light rays from the spotlight are incident on the reflector arrangement and are reflected in a desired direction onto the objects to be illuminated, the light source being positioned such that its light rays are aimed at the reflector arrangement;

the reflector arrangement comprising at least one shell carrier of transparent material which has a tub-shape and a concave curved surface when viewed at a side opposite the spotlight, and wherein an inside of the shell carrier is provided with a vapor-deposited metallic mirror layer such that light rays incident on an outside of the shell carrier pass through the shell carrier and can be reflected by the metallic mirror layer; and cover means provided on the shell carrier at the side opposite the spotlight for durably protecting the mirror layer against environmental influences and direct mechanical influences which might deteriorate or destroy the mirror layer.

* * * * *